Figures 1, 2, 7:
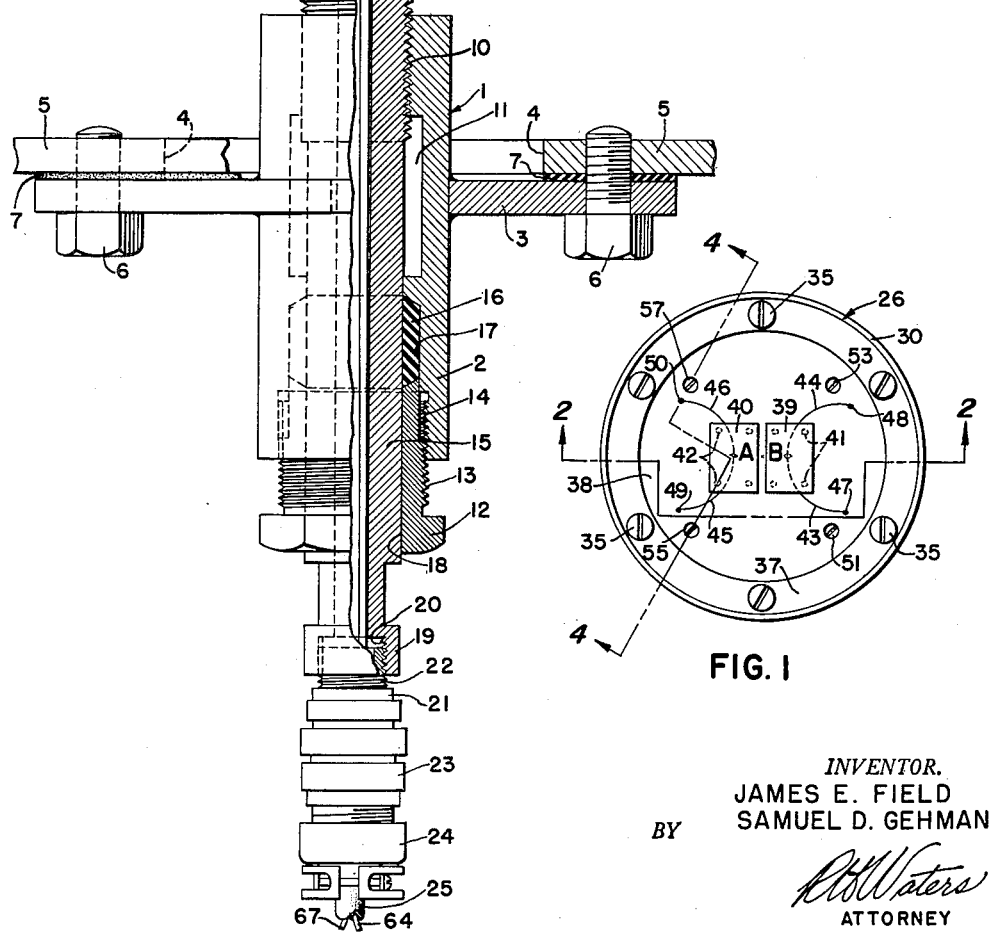

INVENTOR.
JAMES E. FIELD
SAMUEL D. GEHMAN
BY
ATTORNEY

April 21, 1953   J. E. FIELD ET AL   2,635,468
RADIATION TYPE THERMOMETRIC DEVICE
Filed June 2, 1949   2 SHEETS—SHEET 2

INVENTOR.
JAMES E. FIELD
SAMUEL D. GEHMAN
BY
ATTORNEY

Patented Apr. 21, 1953

2,635,468

UNITED STATES PATENT OFFICE 2,635,468

RADIATION TYPE THERMOMETRIC DEVICE

James E. Field and Samuel D. Gehman, Akron, Ohio, assignors to Wingfoot Corporation, Akron, Ohio, a corporation of Delaware Application June 2, 1949, Serial No. 96,742

10 Claims. (Cl. 73—355)

The present invention relates to a means for the measurement of surface temperatures, especially those of moving surfaces. More particularly, the present invention pertains to a radiation type of detector means embodying the thermocouple principle which is so designed that its accuracy will not be affected by ambient temperatures.

There are many and varied types of thermometric devices for the measurement of surface temperatures. Many of these, however, cannot be employed advantageously with moving surfaces such, for example, as the surface of a casting belt employed in the manufacture of cast films, sheets, and the like. One of the most advantageous forms of thermometric device for this purpose employs the thermocouple principle.

Temperature measurements can be obtained by the use of thermometric means having a direct contact with the moving surface. If a high degree of accuracy is desired, however, such contact thermometric devices have been found to be impractical for the measurement of the temperatures of moving surfaces due to losses occurring in brush contacts, wiping means, and other similar forms of mechanical connections. These losses frequently have the same order of magnitude as the voltage generated by the thermocouple of the thermometric means, thereby rendering the device incapable of giving accurate results.

The radiation type detector unit is the simplest form of thermometric means and comprises a receiver of low heat capacity conducting material with a thermocouple attached. This receiver is located in close proximity to the surface of the radiating object whose temperature is to be determined so that a flow of low voltage current is enabled to be induced in the thermocouples. This radiation is absorbed by the receiver, thereby raising or lowering the temperature of the thermocouple. The variation in the voltage generated by the thermocouple permits the use of the thermometric device with any suitable form of potentiometer or electronic type of controller.

It is, therefore, an object of the present invention to provide an improved thermometric device for the measurement of surface temperatures which is both sensitive and accurate, and in which the receiving element comes into substantial temperature equilibrium with the surface being measured so that the readings are relatively independent of the emissivity of the surface.

It is a further object of the present invention to provide a radiation type of thermometric device in which a correction is readily made for the effect of ambient temperatures, thereby insuring greater accuracy of the device.

With these and other objects in view, the invention embodies a detector unit having at least three thermocouples, two of which are arranged to be exposed to the radiating object whose temperature is to be measured and a third at some point remote from the object. This latter thermocouple is adapted to be connected in an electrical circuit in opposition to one of the first mentioned two thermocouples with a suitable precalibrated resistance in the circuit to compensate for the effect of ambient temperatures on the other of the two thermocouples.

Other objects and advantages of the thermometric means of the present invention will become apparent as the detailed description of a preferred form of the device illustrated in the accompanying drawings proceeds.

Figure 4:
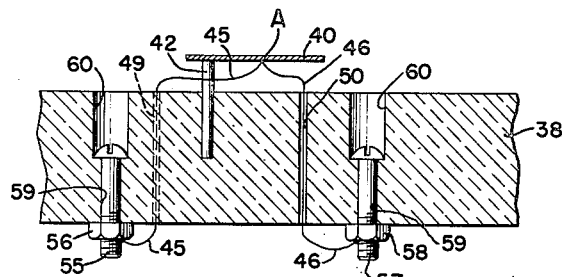
Figures 3, 6:
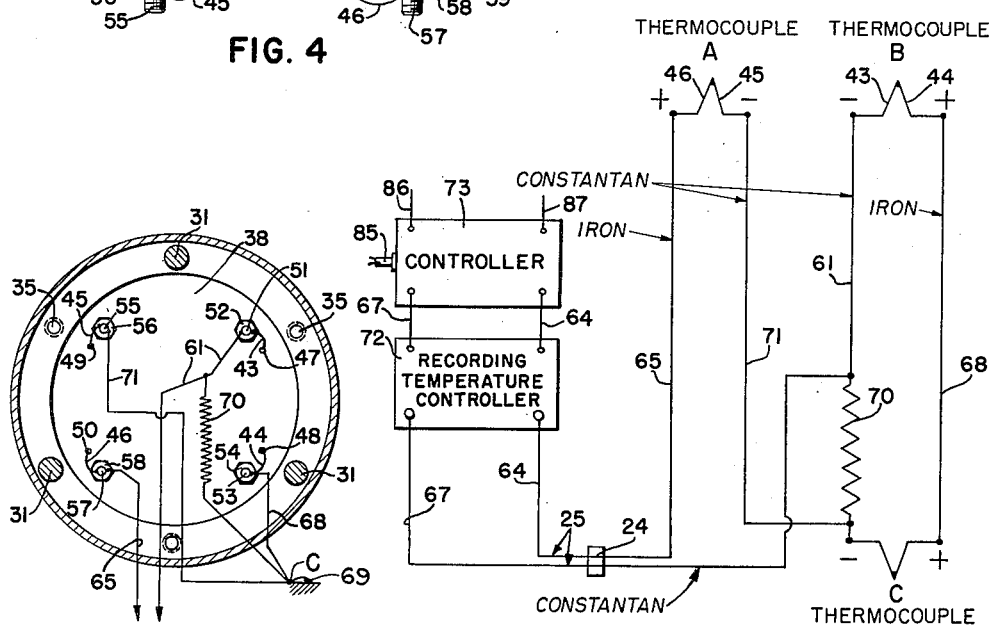

Fig. 1 is a plan view of one type of thermometric device embodying the principles of the present invention. Fig. 2 is a vertical cross section taken substantially along the line 2—2 in Fig. 1 with parts in elevation and broken away. Fig. 3 is a horizontal section through the device of Fig. 2 along the line 3—3 therein. Fig. 4 is an enlarged fragmentary section with parts in elevation as seen from the line 4—4 in Fig. 1.

Figure 5:
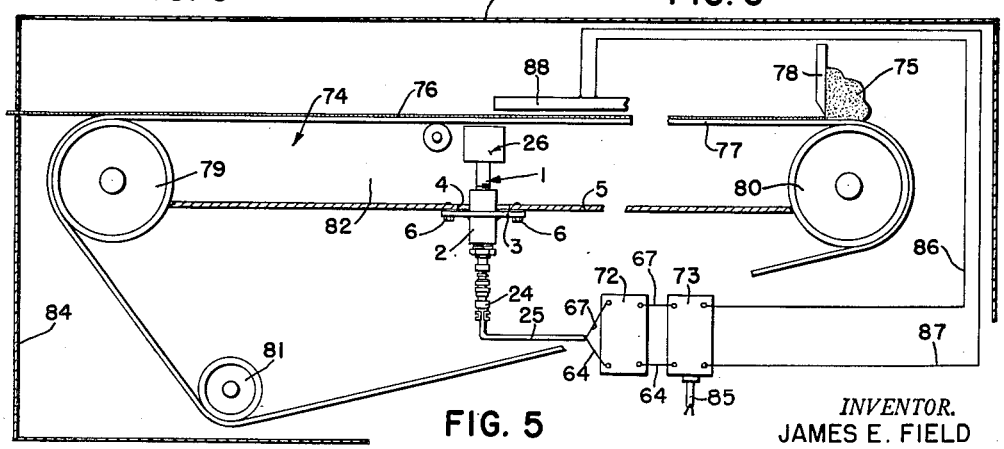

Fig. 5 illustrates the application of the thermometric device of the present invention to a conventional film casting apparatus which has been shown diagrammatically. Fig. 6 is a diagrammatic representation of the electrical circuit for the device. Fig. 7 is a plan view corresponding generally to Fig. 1 of the drawings showing a modified form of the thermometric device of the invention embodying a slightly different design, but involving the same mode of operation.

The preferred embodiment

In Figs. 1 and 2 of the drawings the reference numeral 1 identifies one of the most advantageous forms of radiation type thermometric device embodying the teachings of the present invention. The receiver or thermometric device 1 is provided with a generally cylindrical mounting means or packing box 2 having a supporting or flange portion 3 formed thereon to facilitate its mounting in the apparatus to which it is applied. The flange 3 on the packing box 2 is mounted in the aperture 4 formed in the division wall or separator panel 5 as by means of a plurality of bolts 6 threaded into tapped holes provided in the panel.

The flange 3 serves to support the packing box 2 in vertically disposed relation with respect to the panel 5 so as to extend through the aperture 4. A suitable sealing means or ring gasket 7 is disposed between the flange 3 and the panel 5 so as to encircle the aperture 4 therein. The packing box 2 of the thermometric device 1 is provided with a conduit means or hollow stem 8 which extends through and is disposed in concentric relation to the packing box 2.

The stem 8 is provided adjacent one end thereof with an externally threaded portion 9 which engages the internally threaded bore 10 of the packing box 2. The stem 8 extends through the chamber 11 in the packing box 2 and projects from the lowermost end of the packing box. A packing gland 12 which has an externally threaded portion 13 thereon for engagement with the threaded counterbore 14 on the packing box 2 slidably engages the generally cylindrical portion 15 of the stem 8. The packing gland 12 serves to jam the packing 16 in the pocket 17 of the packing box 2 so as to insure a fluid tight seal about the periphery of the cylindrical portion 15 of the stem 8 when the parts are assembled.

A portion of the stem 8 extending beyond the internal bore 18 of the packing gland 12 has at its extremity a socket 19 having an internal thread 20 therein. A connector 21 having a threaded male portion 22 thereon engages the internal thread 20 in the socket 19. The connector 21 is provided with a plug 23 which is in turn assembled with a clamp 24 for joining a two-wire cable 25 with the connector.

At the opposite extremity of the stem 8 from the cable clamp 24 is disposed a housing means or head 26. The stem 8 has a threaded portion 27 thereon for engagement with an internally threaded hole 28 in the plate 29. The plate 29 as well as the cylindrical housing or cover member 30 demountably secured in any suitable fashion thereto such, for example, as by machine screws or the like is advantageously chromium plated on all of its exposed surfaces.

A plurality of posts 31 are secured to the plate 29 and disposed substantially normal to the face thereof opposite that to which the stem 8 is attached. The posts 31 are provided with threaded end portions 32 extending through the plate 29 and secured thereto as by means of a plurality of nuts 33 threaded on the end thereof. The opposite ends of the several posts 31 have internally threaded counterbores for the reception of machine screws 35 which serve to secure in place thereon a bottom ring 36, a top ring 37, and an intermediate disk 38 of insulating material.

It will be noted from Fig. 3 that it is necessary that only alternate ones of the machine screws 35 be positioned at the posts 31, the remaining machine screws 35 being threaded into suitably spaced tapped holes in the bottom ring 36. One surface of the disk 38 which may be made of any suitable form of non-conducting heat insulating material is adapted to be exposed to the surface of the object whose temperature is to be measured. A plurality of receiving means 39 and 40 are advantageously supported from the exposed surface of the disk 38 as by means of a number of wooden pegs 41 and 42, respectively. The receiving means 39 and 40 are made of a low heat capacity conducting material such, for example, as copper foil and other similar sheet material having these general characteristics. The receiving side of the foil should be blackened with a thin, flat, black lacquer, smoke, or other means and the opposite side may be bright plated.

The receiving means 39 has connected thereto a pair of wires or thermocouple elements 43 and 44 of which element 43 may be formed from constantan while the element 44 is iron. The junction of these elements 43 and 44 at the receiving means 39 thereby cooperates to provide a thermocouple unit identified generally as thermocouple B. The receiving means 40 is similarly provided with a junction of wires or thermocouple elements 45 and 46 of which the element 45 is formed of constantan while the element 46 is iron. As before, the thermocouple elements 45 and 46 cooperate with the receiving means 40 to form a second thermocouple identified generally as thermocouple A (see Fig. 1 of the drawings).

The several thermocouple elements 43, 44, 45, and 46 are arranged to be threaded through openings 47, 48, 49, and 50, respectively, in the disk 38 of insulating material. The ends of the thermocouple elements 43, 44, 45, and 46 extending through the disk 38 are connected in turn to each of the bolts 51, 53, 55, and 57, respectively, disposed in the disk 38 and provided with nuts 52, 54, 56, and 58 to facilitate the connection. The several bolts 51, 53, 55, and 57 are inserted in holes 59 in the disk 38 with the heads thereof being exposed only in the counterbore 60 (see Fig. 4) well below the exposed surface of the disk 38, thereby preventing any unauthorized contact between the several wires 43, 44, 45, and 46 with any exposed metal portions at the surface of the disk.

A reference to Fig. 3 of the drawings will serve to clarify the several connections in the electrical circuit of the thermometric device 1 with the thermocouple elements 43, 44, 45, and 46 projecting through the disk 38 and connected to the several bolts 51, 53, 55, and 57. A main conductor 61 of constantan is advantageously connected to the bolt 51 and its nut 52, thereby insuring positive contact with the thermocouple element 43 secured thereto. The conductor 61 is enclosed in insulation 62 and passed through the bore 63 of the stem 8 to the connector 21 in which it is adapted to be connected with the first wire 64 of the cable 25 (see Fig. 2).

The second main conductor 65, which is formed of iron, is suitably secured to the bolt 57 and its associated nut 58 to which is attached the end of the iron thermocouple element 46. The conductor 65 is enclosed in insulation 66 and passed through the bore 63 of the stem 8 so that it in turn is enabled to be connected as by means of the connector 21 to the cable clamp 24 which establishes its contact with the wire 67 of the cable 25.

An iron connector 68 is secured to the bolt 53 and its nut 54 to which is attached the end of the iron thermocouple element 44. The other end of the iron connector 68 is secured to a machine screw 69 threadably engaged in the plate 29 in the manner indicated in Fig. 2. A resistor element 70 of constantan is connected at one end to the main conductor 61 and at the other to the screw 69 along with the iron connector 68. An additional constantan connection 71 extends between the bolt 55 and its associated nut 56 to which is secured the end of the constantan thermocouple element 45 and the screw 69. The connector 68 of iron and 71 of constantan cooperate with the resistor 70 also of constantan to form a thermocouple junction at the screw 69 which is hereinafter identified as thermocouple C.

The electrical circuit illustrated in Fig. 6 clearly illustrates the relationship of the several thermocouples A, B, and C as well as the relationship of the elements thereof with connectors of like character. It will be noted that the wires 64 and 67 of the cable 25 are adapted to be connected to a suitable temperature indicating means or recording temperature control device 72 which is adapted to be adjusted to respond to variations in the temperature of the object whose temperature is to be maintained within a certain predetermined range by the thermometric device 1. The wires 64 and 67 of the cable 25 are extended from the temperature control device 72 to connect with a suitable control mechanism 73 of a type which is so designed that it will control the supply of energy to suitable heating devices from a power source so as to supply heat to the object the temperature of which is to be maintained.

One application of the thermometric device of the present invention is illustrated diagrammatically in Fig. 5 in which a conventional film casting apparatus identified generally by the reference numeral 74 is illustrated. In the film casting apparatus 74, a supply of thermoplastic material in the form of dope 75, customarily containing a very high percentage (in the range of 80 per cent) of volatile solvents which it is desired to recover, is spread in the form of a thin continuous film or sheet 76 on the endless casting belt 77 as by means of a doctor blade 78. The endless casting belt 77 is supported and driven by the several pulleys 79, 80, and 81.

The volatile solvents driven off in the form of gases by the heat generated in the casting operation are confined in the gas chamber 82 by means of a suitable hood 83 forming part of the cabinet or enclosure 84 shown diagrammatically. The gas chamber 82 is separated from the remainder of the enclosure 84 as by means of the division wall or separator panel 5 previously referred to, and pressures inside the gas chamber are carefully balanced with the atmospheric pressures outside the machine to prevent escape. Several thermometric devices 1 are mounted in the panel 5 at various positions along the path of the endless casting belt 77 for the purpose of defining a series of zones along the length of the belt where varying temperatures are applied, the highest of which is adjacent the position of the doctor blade 78 and ranges to a low near the end of the belt at which the film is removed.

It is characteristic of such operations as that described above that the volatilization of the solvents from the thin sheet 76 produces a rapid cooling effect upon the endless casting belt 77. A substantially uniform temperature must be maintained to insure proper operation of the film casting apparatus 74. It is also essential that the thermometric device employed be quick to react to excessive temperature variations so that if the supply of dope 75 should suddenly become exhausted, the belt 77 will not be damaged by the heat supplied to it.

The cable 25 has its wires 64 and 67 connected to the recording temperature control device 72 and through it to the control mechanism 73 to which power is supplied by the conductors 85 and from which electrical conduits 86 and 87 emanate to connect with the heater unit 88 disposed above the surface of the endless casting belt 77. Each of the several thermometric devices 1 disposed along the length of the endless casting belt 77 is adapted to register the temperature of the belt in that zone, thereby facilitating the control of the temperatures produced by the heater unit or units 88 associated therewith within the desired range of temperatures for that zone.

For most effective results the head 26 of the thermometric device 1 should be disposed in close proximity to the surface of the endless casting belt 77, the spacing being advantageously of the order of approximately one-sixteenth to one-eighth inch. A suitable roller or other similar form of support and guide means should be located under the casting belt 77 adjacent each of the thermometric devices 1 to prevent undue interference from any vertical motion of the belt which may inadvertently occur during the operation of the casting apparatus 74.

*Operation of the device*

It will be understood that the receiving means 39 and 40 are exposed not only to the heat of the casting belt 77, but will also be affected by the ambient temperature created by the gases in the gas chamber 82 and other related factors. As a result of the fact that the temperature to which thermocouple A associated with the receiving means 40 is subjected usually differs from the actual temperature of the belt 77 due to heat transfer from other sources, some compensation is necessary.

Thus, as previously indicated, thermocouples B and C are connected in opposition to each other (see Fig. 6) and the circuit embodying the iron connector 68 and conductor 61 and resistor 70 of constantan is generally referred to as the compensating circuit. It will be apparent from Fig. 6 that the flow of current from the thermocouple A in the constantan connector 71 cannot reach the recorder 72 without being subject to modification by the compensating circuit. The only exception to this general rule is on that rare occasion when the belt temperature and the ambient temperature exactly coincide.

By way of illustration of the operation of the thermometric device 1, let us assume that the ambient temperature to which the thermocouple C responds is higher than the temperature of the belt 77 to which the thermocouple B responds. This difference in temperature between the thermocouples B and C creates a difference in voltage between the two and as a result sets up an electrical current in the compensating circuit. This current flows through the resistor 70 which produces a voltage drop in conformance with Ohm's law ($E=RI$).

The current flow induced in the constantan connector 71 by the temperature of the belt 77 and the surrounding atmosphere on the thermocouple A is modified in its passage to the recording temperature control device 72 and the associated control mechanism 73 by reason of the fact that the connector 71 is connected into the compensating circuit. A voltage drop at the resistor 70 will tend to reduce the voltage of the current flowing to the recorder 72 thus indicating only the accurate or corrected temperature of the belt 77 unaffected by the higher ambient temperature. The operation of the control mechanism 73 in controlling the energization of the heater units 88 will depend upon the predetermined limits within which the temperature control device is set to operate.

If, on the other hand, the thermocouple B responds to a higher temperature than that to which thermocouple C is subjected, the opposite effect to that just described takes place. The thermocouple C induces a current flow in the compensating circuit which steps up the voltage of the current flowing to the recorder 72, thereby registering the true temperature of the belt 77 unaffected by the lower ambient temperature.

The resistor 70 is so designed that it exactly compensates for the heat flow to the thermocouple A from the surrounding atmosphere. In determining the value of the resistor 70, the constantan connector 71 in the circuit for the thermocouple A (see Fig. 6) is temporarily connected to the connector 21 so that this thermocouple operates independently of the compensating circuit and the thermocouples B and C. The thermometric device 1 is suspended in normal spaced relation above a sample segment of the casting belt 7 stationarily mounted on a conventional hot plate (not shown) in an oven (not shown).

The actual contact temperature of the sample segment of the belt is then determined on the recording temperature control device 72 and the temperature shown by the temporarily connected thermocouple A is similarly noted. Then a constantan resistor 70 is inserted in the compensating circuit between the thermocouples B and C and the thermometric device 1 is rewired in accordance with the diagram shown in Fig. 6. The approximate value of resistor 70 required to effect compensation may be readily estimated from the discrepancy of the uncompensated temperature reading, the thermal E. M. F. produced in the iron-constantan circuit by a temperature difference, and the resistance of the circuit. The value of resistor 70 is then precisely adjusted until the discrepancy previously noted between the actual contact temperature of the belt sample and the previous reading of the thermometric device 1 is completely compensated and the device records the identical temperature reading to that obtained by contact.

After the gauge of the wire and the length of the resistor 70 has once been accurately determined, subsequent models of the thermometric devices 1 employing the predetermined standard resistor will only require periodic checking to insure trouble-free operation.

Modifications

Fig. 7 illustrates a modified form of head 89 differing in some respects from head 26 previously described in detail. The head 89 like head 26 has the housing or cover member 30, spaced bottom and top rings 36 and 37, respectively, and the intermediate disk 38 of insulating material held in place by the machine screws 35. The receiving means 90 and 91 of the head 89 are supported above and in generally parallel relation to the exposed surface of the disk 38 as by means of a plurality of pegs 92 to which are secured the suspension elements or wires 93 anchored in the corners of the receiving means. The adjacent edges of the receiving means 90 and 91 opposite those to which the wires 93 are attached are secured to a small plate 94 of mica or other similar insulating material.

The elements 95 and 96 of constantan and iron, respectively, forming the thermocouple junction B' on the receiving means 90 and the similar elements 97 and 98 of the thermocouple junction A' on the receiving means 91 correspond generally to the thermocouples A and B of the head 26 previously described. The several elements 95, 96, 97, and 98 of the thermocouples A' and B' are extended through the apertures 99, 100, 101, and 102 in the disk 38 so as to enable their ends to be secured to the bolts 51, 53, 55, and 57 in the same manner as before. The electrical circuit embodying the several elements herein described is the same as before.

The heads 26 and 89 may be used interchangeably without affecting the accuracy of the thermometric device 1. Certain applications to which the thermometric devices 1 may be put will require a sturdier support for the receiving means to insure against failures due to shorting of the foils, breaking of the junctions, or contacts between the receiving means and the thermocouple elements. The characteristics of the object whose temperature is to be determined or the nature of the apparatus in which it is employed will readily dictate the specific design of the head to be employed.

Other similar modifications which may be made in the thermometric device 1 will be apparent to one skilled in the art.

General

It is intended that the term "ambient temperature" wherever used herein shall mean the temperature of the atmosphere surrounding the thermometric device 1 as well as that contained in the housing or cover means 26.

While certain representative embodiments and details have been shown for the purpose of illustrating the invention, it will be apparent to those skilled in this art that various changes and modifications may be made therein without departing from the spirit or scope of the invention.

We claim:

1. A radiation type thermometric device for determining with a temperature indicating means the temperature of an object corrected as necessitated by the effect of the ambient temperature adjacent thereto, said device comprising a first and second thermocouple spaced apart from each other and in close proximity to the object whose temperature is to be measured, both of said thermocouples being affected by the ambient temperature in the vicinity of the object; a third thermocouple remote from the object; connector means providing conduits for connection to the temperature indicating means; a compensating circuit embodying resistance of predetermined value connecting the first and third thermocouples in opposition to each other to correct for the effect of the ambient temperature on the first and second thermocouples; and an electrical circuit connecting the connector means, the compensating circuit, and the second thermocouple in series.

2. A radiation type thermometric device for determining with a temperature indicating means the temperature of an object corrected as necessitated by the effect of the ambient temperature adjacent thereto, said device comprising two thermocouples disposed in spaced relation to each other and exposed to the object whose temperature is to be measured; a third thermocouple remote from the object; connector means providing conduits for connection to the temperature indicating means; a compensating circuit embodying resistor means of predetermined value connecting one of the thermocouples exposed to the object and the third thermocouple in opposition to each other to correct for the effect of the ambient temperature on the thermocouples exposed to the object; and an electrical circuit series connecting the connector means, the compensating circuit, and the remaining one of the two thermocouples exposed to the object.

3. A radiation type thermometric device for determining with a temperature indicating means the temperature of an object corrected as necessitated by the effect of the ambient temperature adjacent thereto, said device comprising connector means providing conduits for connection to the temperature indicating means; a first thermocouple in close proximity to the object whose temperature is to be determined; a compensating circuit embodying a second thermocouple adjacent but spaced from the first, a third thermocouple remote from the other two but connected in opposition to the second thermocouple, and resistor means of predetermined value to correct for the effect of ambient temperature on the first and second thermocouples; and an electrical circuit series connecting the connector means, the first thermocouple, and the compensating circuit.

4. A radiation type thermometric device for determining with a temperature indicating means the temperature of an object corrected as necessitated by the effect of the ambient temperature adjacent thereto, said device comprising a pair of receiving means disposed in spaced relation to each other and in close proximity to the object whose temperature is to be determined; a thermocouple junction on each receiving means; resistor means of predetermined value for effecting a correction for the ambient temperature; a third thermocouple junction remote from the other two but connected in opposition to one of them with the resistor means therebetween to form a compensating circuit; connector means providing conduits for connection to the temperature indicating means; and an electrical circuit connecting the compensating circuit, the connector means, and the remaining one of the thermocouple junctions adjacent the object in series.

5. A radiation type thermometric device for determining with a temperature indicating means the temperature of an object corrected as necessitated by the effect of the ambient temperature adjacent thereto, said device comprising a pair of receiving means disposed in spaced relation to each other and in close proximity to the object whose temperature is to be determined; a first thermocouple junction connected to one of the receiving means; connector means providing conduits for connection to the temperature indicating means; a compensating circuit embodying a second thermocouple junction connected to the other receiving means, a third thermocouple junction remote from the other two but connected in opposition to the second thermocouple junction, and resistor means of predetermined value to correct for the effect of ambient temperature on the first and second thermocouple junctions; and an electrical circuit connecting the connector means, the first thermocouple, and the compensating circuit in series.

6. A radiation type thermometric device for determining with a temperature indicating means the temperature of an object corrected as necessitated by the effect of the ambient temperature adjacent thereto, said device comprising a housing means; an insulated panel in the housing means; and a pair of like receiving means each of which is characterized by a thin foil of low heat capacity conducting material; a plurality of insulated means supporting the receiving means in spaced relation to each other from the insulated panel and in exposed relation to the object whose temperature is to be determined; a thermocouple junction connected to each receiving means; a thermocouple junction disposed in the housing means; connector means providing conduits for connection to the temperature indicating means; a compensating circuit interconnecting the housing thermocouple junction in opposition to the thermocouple junction associated with one of the receiving means, a resistor means of predetermined value in the compensating circuit between the thermocouple junctions to provide a correction for the effect of the ambient temperature on the remaining one of the thermocouple junctions associated with the receiving means; and an electrical circuit connecting the compensating circuit in series with the connector means and the remaining thermocouple junction.

7. A radiation type thermometric device for determining with a temperature indicating means the temperature of an object corrected as necessitated by the effect of the ambient temperature adjacent thereto, said device comprising a housing means; means supporting the housing means; an insulating panel in the housing means; a pair of receiving means supported from the insulating panel in spaced relation to each other and exposed to the object whose temperature is to be determined; a thermocouple junction connected to each receiving means; a third thermocouple junction disposed internally of the housing means; connector means on the supporting means providing conduits for connection to the temperature indicating means; resistor means of predetermined value; a compensating circuit connecting the third thermocouple junction in opposition to one of the thermocouple junctions associated with the receiving means with the resistor means therebetween; and an electrical circuit series connecting the other of the thermocouple junctions associated with the receiving means, the compensating circuit, and the connector means.

8. Radiation type thermometric apparatus for determining the temperature of a continuously moving object corrected as necessitated by the effect of ambient temperature adjacent to the object, said apparatus comprising a temperature indicating means; three bimetallic thermocouples, only two of which are adjacent and exposed to the object the temperature of which is to be measured, while the third is disposed remote from the object; a resistor of predetermined value connected between the like metallic portions of one of the thermocouples adjacent the object and the thermocouple remote from said object, said temperature indicating means, said resistor and the remaining thermocouple being connected in series; and means connecting the remaining like metallic portions of the thermocouples between which the resistor is connected to complete the circuit.

9. Radiation type thermometric apparatus for determining the temperature of a continuously moving object corrected as necessitated by the effect of the ambient temperature adjacent the object, said apparatus embodying a temperature indicating means and a receiver comprising a housing; an insulating panel in the housing; a pair of receiving means supported from the panel spaced apart from each other so as to be adjacent and exposed to the object the temperature of which is to be determined; a bimetallic thermocouple junction secured to each receiving means; a third bimetallic thermocouple junction disposed internally of the housing remote from the object; a resistor of predetermined value connected between the like metallic portions of one of the thermocouple junctions connected to a receiving means and the thermocouple junction disposed within the housing, said temperature indicating means, said resistor and the remaining thermocouple being connected in series; and means connecting the remaining like metallic portions of the thermocouples between which the resistor is connected to complete the circuit.

10. Radiation type thermometric apparatus for determining the temperature of a continuously moving object corrected as necessitated by the effect of the ambient temperature adjacent the object, said apparatus embodying a temperature indicating means and a receiver comprising a first receiving means adjacent and exposed to the object the temperature of which is to be determined; a second receiving means spaced from the first and exposed to said object; a first bimetallic thermocouple in contact with the first receiving means; a second bimetallic thermocouple in contact with the second receiving means; a third bimetallic thermocouple remote from the other two and exposed to a circumambient milieu wherein the ambient temperature prevails; a resistor of predetermined resistance value interconnecting the like metallic portions of the second and third thermocouples in opposition to each other, whereby the differential of the respective electromotive forces of the second and third thermocouples determines the flow of current through the resistor, said temperature indicating means, said resistor and the first thermocouple being connected in series; and means connecting the remaining like metallic portions of the second and third thermocouples to complete the circuit.

JAMES E. FIELD.
SAMUEL D. GEHMAN.

References Cited in the file of this patent

UNITED STATES PATENTS

| Number | Name | Date |
| --- | --- | --- |
| 1,643,582 | Martin | Sept. 27, 1927 |
| 1,883,444 | Albert | Oct. 18, 1932 |
| 2,138,593 | Breitenstein | Nov. 29, 1938 |

FOREIGN PATENTS

| Number | Country | Date |
| --- | --- | --- |
| 7,597 | Great Britain | Apr. 26, 1915 |